United States Patent [19]

Abramczyk

[11] Patent Number: 4,949,992
[45] Date of Patent: Aug. 21, 1990

[54] COLLAPSIBLE STEERING COLUMN

[75] Inventor: William M. Abramczyk, Rochester Hills, Mich.

[73] Assignee: Ford Motor Company, Dearborn, Mich.

[21] Appl. No.: 402,165

[22] Filed: Sep. 1, 1989

[51] Int. Cl.<sup>5</sup> ............................................. B62D 1/18
[52] U.S. Cl. ....................................... 280/777; 74/492
[58] Field of Search ................ 280/777, 779, 750; 74/492, 555

[56] References Cited

U.S. PATENT DOCUMENTS

| | | | |
|---|---|---|---|
| 3,461,740 | 8/1969 | Tajima et al. | 280/777 |
| 3,468,182 | 9/1969 | Shwartzberg | 280/777 |
| 3,597,994 | 8/1971 | Shiomi et al. | 74/492 |
| 3,600,971 | 8/1971 | Scarvelis et al. | 74/492 |
| 3,612,223 | 10/1971 | Shiomi et al. | 188/1 C |
| 3,760,650 | 9/1973 | Pardy | 74/492 |
| 3,805,636 | 4/1974 | Howes | 74/492 |
| 3,899,937 | 8/1975 | Nagazumi | 74/492 |
| 4,020,651 | 5/1977 | Callies | 74/492 |
| 4,098,141 | 7/1978 | Yamaguchi | 280/750 |
| 4,117,741 | 10/1978 | Yazane et al. | 74/492 |
| 4,143,735 | 3/1979 | Schlanger | 74/492 |
| 4,274,299 | 6/1981 | Jones | 74/492 |
| 4,452,096 | 6/1984 | Workman | 74/492 |
| 4,627,306 | 12/1986 | Berenjian | 74/492 |
| 4,674,354 | 6/1987 | Brand | 280/777 |
| 4,703,669 | 11/1987 | Hyodo | 74/492 |
| 4,746,144 | 5/1988 | Kulczyk | 280/777 |
| 4,773,674 | 9/1988 | Wierschem | 280/777 |
| 4,786,076 | 11/1988 | Wierschem | 280/777 |

Primary Examiner—Richard A. Bertsch
Attorney, Agent, or Firm—Robert F. Hess; Daniel M. Stock; Keith L. Zerschling

[57] ABSTRACT

An energy absorbing vehicular steering column assembly (10) including telescopically engaged upper and lower column tubes (16,17). The upper column tube (16) being mounted to a steering column support member (12) at its rearward end by a break-away coupling member or bracket (20) affixed to the upper column tube and having shear modules (44) forming a portion of the bracket, thus allowing it to break-away from the steering column support member upon driver impact. The remainder of the steering column assembly including means (22) for absorbing impact loads through a plastic deformation as the column tubes move together axially during a collision, and a pair of axially oriented relatively non-deformable plate-like slide members (60) secured to the steering column support member (12) and positioned between the break-away coupling and the steering column support member and on which a portion (42) of the break-away bracket or coupling member may slide as the upper column tube is collapsing.

9 Claims, 1 Drawing Sheet

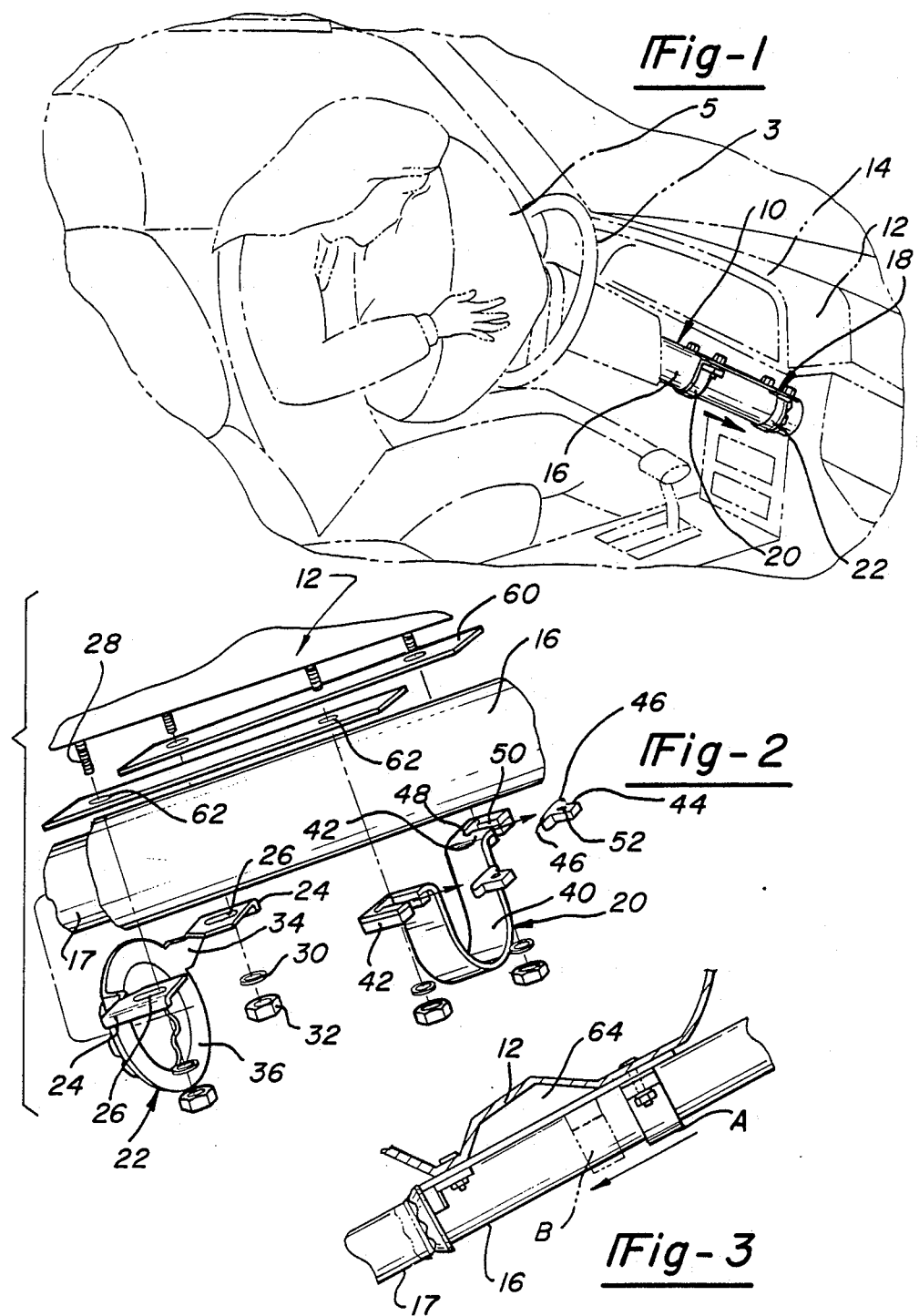

ated with the assignee of the present invention.
COLLAPSIBLE STEERING COLUMN

TECHNICAL FIELD

This invention relates to collapsible steering columns for motor vehicles.

BACKGROUND OF THE INVENTION

Conventional collapsible steering columns usually include the basic concept of a steering column comprising telescopically engaged upper and lower column tubes, and a steering shaft rotatably disposed within the telescopically engaged upper and lower column tubes. A steering wheel is secured to the rearward end of the steering shaft. The upper column tube is mounted to a steering column support member, usually affixed to the dashboard assembly with a bracket assembly. The bracket assembly generally includes means for absorbing impact loads through plastic deformation as the column tubes move together axially during a collision. Such an arrangement is shown in U.S. Pat. No. 4,627,306 presently assigned to the assignee of the present invention.

In the art of providing a collapsible steering column having a telescopically engaged, relatively collapsible upper and lower column tubes, it is also known to provide the damping means at the lower column tube and to provide that the upper column be connected to a steering column support member by means allowing the upper column tube to slip free of its connection. Such a means may include a clamp permanently fixed to the upper column member and including slip clips or shear modules built within the flange of the clamp that is secured to the column support member. Thus it has been provided that the upper column member upon impact by the driver can be sheared loose of the column support member at this same clamp. Such an arrangement is shown in U.S. Pat. No. 4,274,299 assigned to the assignee of the present invention.

In none of these prior art structures has attention been paid to the problem of assuring that upon impact resulting during a collision the steering column will collapse in an axial manner with minimal interference from the irregularities of the column support member along the collapsible axial extent of the steering column member. In other words, in conventional systems representing the current state-of-the-art, the column support member surface to which the upper column tube of the steering column is bolted is irregular in shape. Thus there would normally appear a number of cavities on what would otherwise be an adjacent abutting surface of the steering column support member. During collision it has been found that these surface irregularities form pockets into which the upper column tube may deform, thus adversely affecting the controlled collapse of the steering column pursuant to its engineered design.

At best it is known that the direction of the axial force caused by the driver colliding with the steering column can be controlled so that the principal force vector is along the axis of the steering column. Such an arrangement is shown in U.S. Pat. No. 4,703,669.

SUMMARY OF THE INVENTION

The energy absorbing steering column of the present invention includes telescopically engaged upper and lower column tubes, and a steering shaft rotatably suspended within the telescopically engaged lower and upper column tubes. A steering wheel is secured to the rearward end of the steering shaft. The upper column tube is mounted to a steering column support member at its rearward end with a break-away coupling member or bracket integrally cast as part of the upper column member, or otherwise permanently affixed thereto, having shearable fasteners or shear modules forming a portion of the bracket as it is clamped to the steering column support member. At the front end of the upper column tube there is included a bracket having means for absorbing impact loads through plastic deformation as the column tubes move together axially during a collision. One portion of the bracket is permanently affixed to the upper column tube and another portion of the bracket is permanently affixed to the steering column support member. Extending between each bracket and secured to the steering column support member by the same bracket fastening means at both the upper and lower brackets is at least one axially oriented plate-like member acting as a relatively non-deformable slide member upon which a portion of the break-away bracket or coupling member may slide as the upper column tube is collapsing, thereby assuring that the collapsible upper column tube will slide in an axial direction upon impact and without deformation into the column support member.

As a further aspect of the present invention, the plate-like slide member is provided with a coefficient of friction substantially less than that otherwise provided by the (i) steering column support member or (ii) the rearward most clamp bracket (designed to axially slide along the column support member with the upper column tube) holding the upper column tube to the column support member.

Thus it is an object of the present invention that means be provided for allowing the upper column tube of a collapsible steering column to collapse in its axial direction without deformation into the steering column support member.

It is a further object of the present invention to provide means whereby the upper steering column tube will collapse relative to the steering column support member without the collision energy being dissipated in an uncontrolled manner by friction loss or surface deformation.

It is still another object of the invention that the surface irregularities designed into an upper column support member can be eliminated by means of providing a plane interface between the column support member and the bracket supporting the upper column tube of the steering column.

Other objects, advantages and novel features of the present invention will become apparent from the following detailed description of the invention when considered in conjunction with the accompanying drawings.

BRIEF DESCRIPTION OF THE DRAWINGS

FIG. 1 is an illustration showing the arrangement of the steering column tube during the initial stage of a collision and showing a fragmentary perspective view of the upper column tube portion of the steering column;

FIG. 2 is an expanded fragmentary elevation view of the upper column tube as it is to be affixed to the column support member in accordance with the present invention;

FIG. 3 is a fragmentary side elevation of a portion of the collapsible steering column member as affixed to a column support member in accordance with the present invention.

DESCRIPTION OF THE PREFERRED EMBODIMENT

In FIG. 1 there is shown a general illustration of a driver 1 behind a steering wheel 3 at the moment of impact or collision. It will be noted that an air bag 5 has expnnded to cushion the driver from impact with the steering wheel 3. The steering wheel is connected to the rearward most portion of a collapsible steering column 10 affixed to a steering column support member 12 forming part of the front dashboard assembly 14 of a vehicle. Located on the upper column tube 16 of the collapsible steering column is a clamping system generally indicated at 18. Details of the clamping system 18 are best noted in FIGS. 2 and 3.

In FIG. 2 it is to be noted that the clamping system 18 comprises a first bracket or clamp 20 located at the rearward most end of the upper column tube, namely that closest to the steering wheel, and a second bracket or clamp 22 located at the opposite end of the upper column tube. The bracket 22 is constructed so as to be able to absorb collision force or to damp the collision force as the upper column tube collapses upon the telescopically arranged lower column tube of the steering wheel 3. This bracket is known as a bend strap. It is comprised of mounting pads 24 having apertures 26 through which fasteners pass to mount the bracket to the steering column support member 12. As shown, the fasteners include bolts 28 extending from the column support member and adapted to pass through the aperture 26 of the bracket and to be secured by the nut-washer arrangement 30, 32. The bracket includes a central section welded or otherwise fixed to the upper column tube 16. Energy absorbing sections 34 lie on each side of the central section 36 connecting it with the mounting pads 24.

The construction and operation of this bracket during collision is described in U.S. Pat. No. 4,627,306, which is incorporated herein by reference.

Bracket 20 likewise includes a central section 40 and radially extending mounting pads 42 extending from the open end of this otherwise U-shaped bracket member.

Located within and forming part of each mounting pad 42 is a slip clip or shear module 44. These shear modules can be of any known construction. One construction particularly acceptable is that which includes a shearable projection 46 located on transverse side of the shear module and nested within a corresponding respective lock pocket 48 forming part of the openended aperture 50 of each mounting pad 42. Each shear module includes an aperture 52 through which a bolt 28 may pass to provide for the bracket being secured to the column support member 12.

The construction and operation of such a bracket is described in U.S. Pat. No. 4,274,299, which is incorporated herein by reference.

Arranged between the mounting brackets 20 and 22 and the column support member 12 is a pair of slide plates 60. Each slide plate is preferably made of steel having a substantial thickness of approximately 0.025 inches. At each end of each slide plate there is formed an aperture 62 for receiving the respective fastener 28 in the column support member 12. Each slide plate is coated with a friction coefficient reducing agent such as polytetrafloraethylene (PTFE), or its equivalent. Alternatively the surface of the steel could be highly polished. Each slide plate 60 is held fixed to the column support member and will not move relative to the column support member during any collision since it is secured by the bolt members 28.

As best seen in FIG. 3, the slide plates form the means by which any surface irregularity or gap 64 otherwise presented by the column support member to the steering column brackets is closed. Often these cavities are formed in the column support member by reason of the fact that it is cast or stamped and there are certain strengthening ribs built into the structure of the column support member. Also, the cavities are sometimes formed in the column support member for purposes of being able to pass electrical wires and the like through the dashboard structure. In any event the slide plate members 60 serve to provide a flat uninterrupted surface extending along the entire axial length that the collapsible steering column upper column tube 16 will collapse. In other words, the upper column tube can collapse from position A, its initial position, as seen in FIG. 3, to a final position B. The slide plate members 60 span this distance and more.

In operation, upon collision, the air bag 5 will be inflated between the steering wheel and the driver as shown in FIG. 1. Should the collision reach a certain impact force, the upper column tube will break from the support bracket 20 as a result of the shear modules being sheared away from the remainder of the bracket 20. This then allows the upper column tube and steering wheel to collapse along its axial extent deforming the second bracket 22 at the energy absorbing sections 34 which are caused to bend. The bending deformation of energy absorbing sections 34 will be accompanied by rotation of mounting tabs 24 about fasteners 28. This rotation occurs in a common plane about axes lying perpendicular to the central axis of the steering column and is accompanied by a reduction in the radius of curvature of energy absorbing sections 34. Deformation of energy absorption sections 34 will accordingly absorb some of the impact energy imposed on the steering column, all as explained in greater detail in previously mentioned U.S. Pat. No. 4,627,306. Throughout this collapse, the mounting pads 42 of bracket member 20 will slide along the plane surface of the slide plates 60 with little impact force being lost due to any frictional resistance between the bracket member and the slide plates 60. This then assures that the axial force is substantially and entirely transferred to the bend strap which is designed to collapse the steering column in a controlled and predetermined manner.

Although the present invention has been described and illustrated in detail, it is to be clearly understood that the same is by way of illustration and example only, and is not to be taken by way of limitation. The sphere and scope of the present invention are to be limited only by the terms of the appended claims.

WHAT IS CLAIMED IS:

1. A collapsible steering column assembly for a vehicle adapted to be connected to a steering column support member secured to a vehicle dashboard assembly, said steering column assembly being collapsible relative to said support member and comprising;
    a break-away coupling member fixed to one end portion of said steering column assembly and being adapted to connect said steering column assembly to said steering column support member;

an energy absorbing means integral with and located at the remaining portion of said steering column assembly and adapted to be affixed to the vehicle dashboard assembly;

an axially oriented slide means adapted be secured between said steering column support member and the remainder of said steering column assembly, said slide means including a flat plane substantially rigid slide surface;

said break-away coupling member including a slide portion means in sliding engagement with said slide surface for allowing that upon the vehicle occupant's impact with a steering wheel at said one end portion of said steering column assembly during a collision the steering column assembly will slide axially in the direction of the dashboard assembly relative to the steering column support member.

2. The collapsible steering column assembly of claim 1 wherein said slide surface of said slide means has a coefficient of friction substantially less than the adjacent respective surfaces of said steering column support member.

3. The collapsible steering column assembly of claim 1 wherein said slide surface of said slide means has a length at least substantially equal to the axial extent said steering column assembly may collapse relative to said steering column support member and being substantially rigid throughout its length so as to withstand any substantial bending deformation during impact thereby (I) transferring the entire axial load of the impact to the break-away coupling and the energy absorbing means located at said remaining portion of the steering column assembly and (II) assisting in maintaining the axial direction of the collapse of said steering column assembly.

4. The collapsible steering column assembly of claim 3 wherein said slide surface is polytetrafloraethylene.

5. The collapsible steering column assembly of claim 1 wherein, said steering column assembly comprises an upper column tube and a lower column tube concentrically located within and telescopically arranged relative to said upper column tube, said break-away coupling comprising a central section fixed to said upper column tube and a mounting pad extending from a least one end of said central section transversely of the axis of said upper column tube, said mounting pad including a shear module adapted to shear free of the remainder of said mounting pad during impact, said mounting pad constituting said slide portion means of said break-away coupling member.

6. The collapsible steering column of claim 5 wherein, said break-away coupling member being fixed to said upper column tube at one end thereof, said energy absorbing means being fixed to the other end of said upper column tube and comprising a bracket having at least one mounting pad located at a free end thereof, said slide means extending in length the full distance between the respective mounting pad of said break-away coupling member and said energy absorbing means and being adapted to be fixed to said steering column support member by said mounting pads.

7. The collapsible steering column of claim 6 wherein, both said break-away coupling and said energy absorbing means include a pair of mounting pads, each pair being arranged transversely of the axis of said upper column tube, and said slide means comprising a pair of flat slide plates, each plate extending axially of the upper column tube from a respective mounting pad of said break-away coupling member to a respective mounting pad of said energy absorbing means.

8. The collapsible steering column of claim 7 wherein each said slide plate is made of steel and includes a coating of polytetrafloraethylene on at least the surface contiguous with each said mounting pad.

9. A collapsible steering column assembly for a vehicle adapted to be connected to a steering column support member secured to a vehicle dashboard assembly, said steering column assembly being collapsible relative to said support member and comprising:

an upper column tube and a lower column tube, the upper column tube being adapted to be operatively associated with a steering wheel, one said tube being telescopically received within the other, and each being collapsible relative to the other upon collision and the occupants resulting impact of a predetermined magnitude with the steering wheel;

a coupling member operatively affixed to one end portion of said steering column assembly and being adapted to connect said steering column assembly to said steering column support member;

an energy absorbing means operatively affixed to the remaining portion of said steering column assembly and adapted to be affixed to the vehicle dashboard assembly;

an axially oriented slide means adapted to be secured between said steering column support member and the remainder of said steering column assembly, said slide means including a flat plane substantially rigid slide surface;

said upper column tube including a slide portion means in sliding engagement with said slide surface for allowing that upon the vehicle occupant's impact with the steering wheel at said one end portion of said steering column assembly during a collision, the steering column assembly will slide axially in the direction of the dashboard assembly relative to the steering column support member.

* * * * *

UNITED STATES PATENT AND TRADEMARK OFFICE
CERTIFICATE OF CORRECTION

PATENT NO. : 4,949,992

DATED : August 21, 1990

INVENTOR(S) : William M. Abramczyk

It is certified that error appears in the above-identified patent and that said Letters Patent is hereby corrected as shown below:

Abstract, line 8, "break-away" should be --break away--.

Column 1, line 25, after "having" delete "a".

Column 3, line 11, "expnnded" should be --expanded--.

Column 3, line 51, after "on" insert --the--.

Column 3, lines 53-54, "ope-nended" should be --open-ended--.

Column 5, line 5 (Claim 1), before "be" insert --to--.

Column 5, line 47 (Claim 5), "a" should be --at--.

Column 6, line 35 (Claim 9), "occupants" should be --occupant's--.

Signed and Sealed this

Twenty-fourth Day of December, 1991

Attest:

HARRY F. MANBECK, JR.

*Attesting Officer*  *Commissioner of Patents and Trademarks*